Oct. 1, 1963　　　F. K. MUELLER ETAL　　　3,105,657
SPHERICAL-FLYWHEEL ATTITUDE-CONTROL SYSTEM
Filed July 13, 1961　　　　　　　　　　　　　11 Sheets-Sheet 1

Fritz K. Mueller,
Heinrich C. Rothe,
Wilhelm E. Rothe,
Robert C. Martin, and
Aaron G. Loughead,
INVENTORS.

BY
ATTORNEY.

F.K. Mueller,
H. C. Rothe,
W. E. Rothe,
R.C. Martin, and
A.G. Loughead,
INVENTORS.

Oct. 1, 1963  F. K. MUELLER ETAL  3,105,657
SPHERICAL-FLYWHEEL ATTITUDE-CONTROL SYSTEM
Filed July 13, 1961  11 Sheets-Sheet 4

F.K.Mueller,
H.C.Rothe,
W.E.Rothe,
R.C.Martin, and
A.G.Loughead,
INVENTORS.

BY *Alvin E. Moore,*
ATTORNEY.

Oct. 1, 1963  F. K. MUELLER ETAL  3,105,657
SPHERICAL-FLYWHEEL ATTITUDE-CONTROL SYSTEM
Filed July 13, 1961  11 Sheets-Sheet 8

F.K. Mueller,
H.C. Rothe,
W.E. Rothe,
R.C. Martin, and
A. G. Loughead,
INVENTORS.

BY Alvin E. Moore,
ATTORNEY.

Oct. 1, 1963  F. K. MUELLER ETAL  3,105,657
SPHERICAL-FLYWHEEL ATTITUDE-CONTROL SYSTEM
Filed July 13, 1961  11 Sheets-Sheet 9

F.K.Mueller,
H.C.Rothe,
W.E.Rothe,
R.C.Martin, and
A.G.Loughead,
INVENTORS.

BY *Alvin E. Moore,*
ATTORNEY.

Oct. 1, 1963    F. K. MUELLER ETAL    3,105,657
SPHERICAL-FLYWHEEL ATTITUDE-CONTROL SYSTEM
Filed July 13, 1961    11 Sheets-Sheet 10

F.K. Mueller,
H.C. Rothe,
W.E. Rothe,
R.C. Martin, and
A.G. Loughead,
INVENTORS.

BY *Alvin E. Moore,*
ATTORNEY.

Oct. 1, 1963        F. K. MUELLER ETAL        3,105,657
SPHERICAL-FLYWHEEL ATTITUDE-CONTROL SYSTEM
Filed July 13, 1961                                11 Sheets-Sheet 11

F.K. Mueller,
H.C. Rothe,
W.E. Rothe,
R.C. Martin, and
A.G. Loughead,
INVENTORS.

BY Alvin E. Moore,
ATTORNEY.

United States Patent Office 3,105,657
Patented Oct. 1, 1963

3,105,657
SPHERICAL-FLYWHEEL ATTITUDE-CONTROL SYSTEM
Fritz Kurt Mueller, Wilhelm Ernest Rothe, Heinrich Carl Rothe, Robert Cherry Martin, and Aaron George Loughead, all of Huntsville, Ala.
Filed July 13, 1961, Ser. No. 131,042
17 Claims. (Cl. 244—1)

This invention relates to a relatively light-weight and powerful system for control of the attitude of a satellite or other space vehicle.

Several difficult inventive problems have been encountered by inventors who have attempted to devise such a system that is efficiently and practically operable in the airless conditions of space. The attitude-control means that is presently utilized comprises reaction jets, by means of which gaseous materials are ejected from a vehicle. This means is impractical for long-duration orbits or space-flights because it entails transport from the earth's surface of the ejected materials. Another control system that has been proposed comprises three flywheels, one mounted on an axis that is parallel to or coincides with each major axis of the vehicle, and an electric motor, actuated in response to an attitude-indicating signal, for driving (or alternatively braking) each flywheel and thus placing a reactive torque on the vehicle. This system has two defects: (1) it requires three separate flywheels, motors and sets of bearings, with a resulting excessive weight; and (2) it involves highly undesirable, accuracy-disturbing, cross-coupling effects that result from the three different precessional, gyroscopic forces that are imposed on the flywheels by the various deviations and corrections of the vehicle's attitude. Evaluation of these effects can be accomplished only by a highly complicated electronic computer.

A third type of control system that has been proposed entails the use of a single spherical, hollow flywheel that is mounted for attitude-correcting rotation by an hysteresis motor about any one of a multiplicity of axes. Although this proposal eliminates the difficulty of the cross-coupling effects on three single-axis flywheels, it has the defect that its hysteresis motor is relatively inefficient. This type of motor depends on the lagging of the values of resulting magnification because of changing magnetizing force; and the hysteretic loss thus caused involves heat of molecular change that is difficult to dissipate in the airless condition of space. The hysteresis motor also requires that the rotatable sphere be of magnetic material, such as iron or steel; and the extra weight of this material undesirably limits the maximum diameter of the ball. These shortcomings restrict use of the hysteresis motor to the correction of attitude disturbances of no more than about ½ g of accelerations.

In view of the above facts, it is an object of the present invention to provide an attitude-controlling system for a space vehicle that comprises a hollow, spherical flywheel of light-weight, highly conductive material and an efficient, eddy-current driving means for the flywheel that utilizes eddy currents produced in varying portions of said highly conductive material by torque-providing electromagnetic coils that are fixed to the vehicle.

Another object of the invention is to provide an attitude-controlling system for use in space comprising a light-weight, aluminum-alloy flywheel ball, suspended on air bearings, a low-heat, electrically-driven compressor for supplying air to the bearings, a low-heat electric motor for rotating the ball, and a metallic, hermetically-sealed, air-containing casing that encloses the other elements; whereby the small amounts of heat that are generated by the flywheel bearing, compressor and motor are transmitted via the air in the casing to its metallic exterior and thence are radiated into airless space.

A further object is to provide an attitude-controlling system for a space vehicle that comprises a hollow, spherical flywheel, an eddy-current motor for rotating the flywheel in changing the attitude of the vehicle, inductive means for sending a signal indicating the speed of the sphere, and means, influenced by the signal when the angular velocity of the ball about any axis reaches a predetermined maximum, for reducing this speed back to zero (or, alternatively, to a value near zero), and thus to a new beginning of the vehicle-influencing storage of momentum by the flywheel, about this axis.

The foregoing and other objects of the invention will become more fully apparent from the following detailed description of the inventive structure and from the accompanying drawings, in which.

Figure 1:
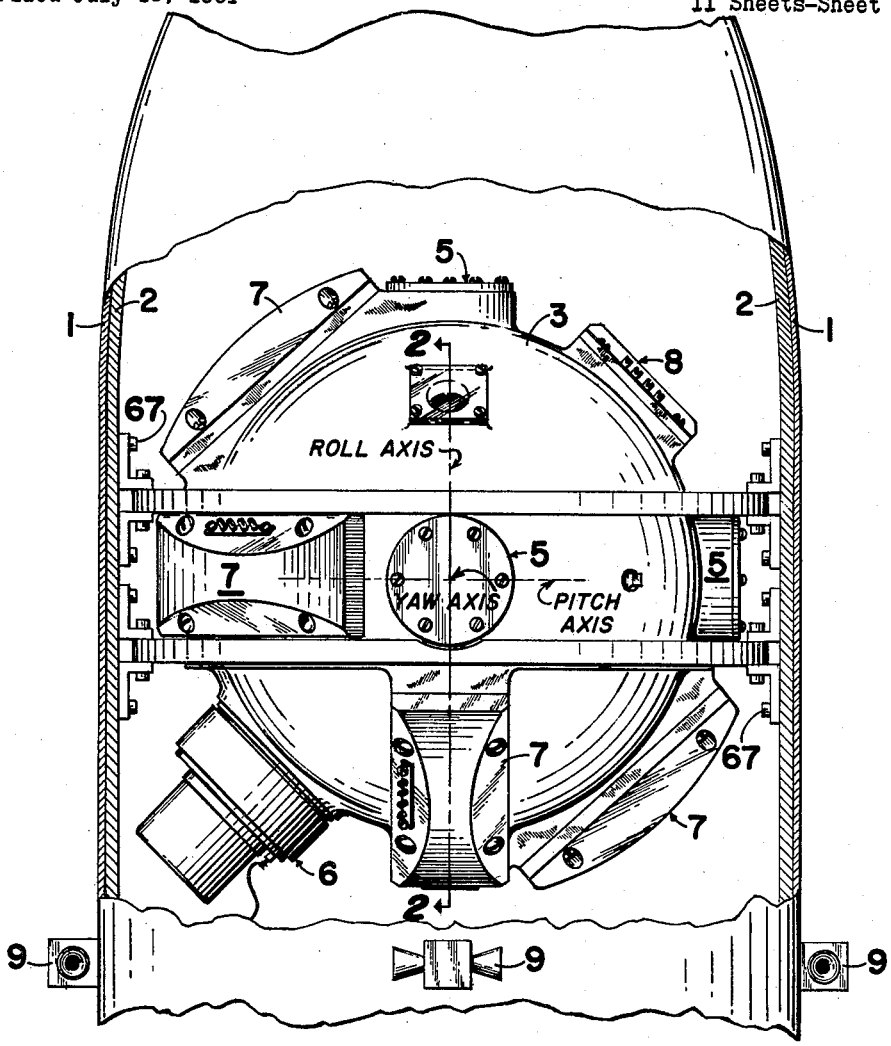
FIGURE 1 is a semi-schematic view of the invention, showing a space vehicle with its shell partly broken away to provide a plan view of the flywheel assembly.
Figure 2:
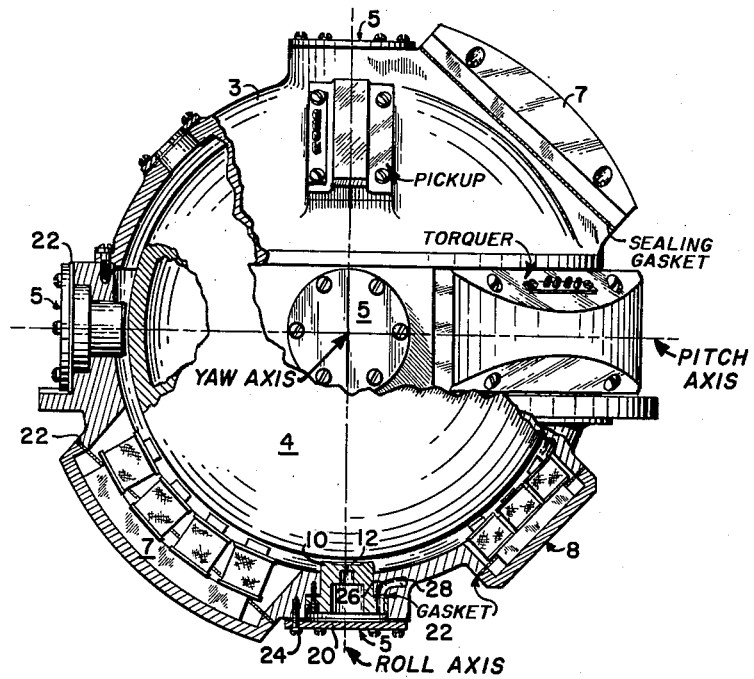
FIGURE 2 is an elevational view of the flywheel assembly, with parts of its casing shown in section as viewed from the plane indicated by arrows 2—2 of FIGURE 1.

In FIGURES 1 and 2 there are shown: a satellite or other space vehicle, having roll, pitch and yaw axes, a shell 1, and a support 2 which as shown may be part of the main vehicle framework; an hermetically-sealed casing 3, fixed to the framework and shell; a hollow, spherical flywheel 4; air-bearing units 5; a compressor unit 6; torquers 7, for placing a torque on ball 4; tachometer or speed-pickup units 8; and reaction-providing jet units 9, equidistantly mounted on the outer periphery of said shell, that are actuated in response to a signal from pickups 8 indicating that the sphere has reached a maximum speed about one of its three major axes. Preferably there are four of the auxiliary jet units 9; one of these is not visible in FIGURE 1.

Figure 4:
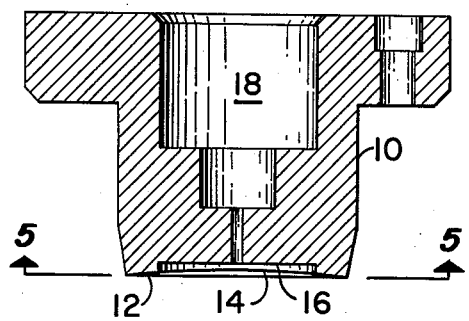
FIGURE 4 is a detail, sectional view of one of the air-bearing pads.
Figure 5:
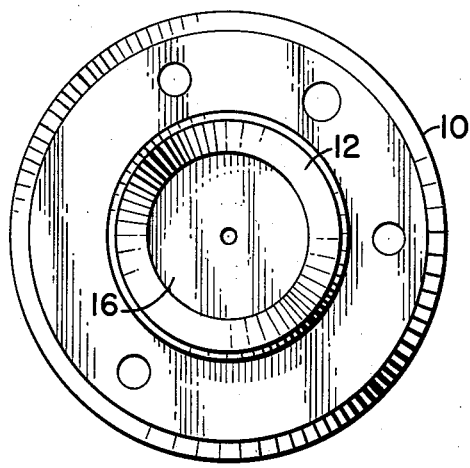
FIGURE 5 is a view of the pad from the plane 5—5 of FIGURE 4.

Casing 3 is hermetically sealed to prevent escape of the gas (preferably air) which is utilized in forming gaseous-bearing films that support ball 4. As indicated in FIGURE 4, each gaseous-bearing unit 5 comprises a pad 10, having an annular flange 12, and spherical surface 14, with a center of curvature at the center of sphere 4. The pad also has two surge-preventing reservoirs, one formed by the shallow, annular recess 16, and another shown at 18. Each of the outwardly-facing reservoirs 18 is sealingly closed against casing 3 by means of cover 20, gasket 22 and bolts 24. Although four or any larger even number of the air-bearing units may be utilized, their optimum number is four.

These units receive air from conduits 26 which are flow-connected with each other and with compressor unit 6 by means of bores 28 that are drilled in the casing wall. Optionally and in lieu of these bores, a manifold such as is semi-schematically indicated at 30 in FIGURE 3 may be fixed to the outside of casing 3, to connect the pump output with all the bearing pads. This manifold comprises annular pipe 32 (centered at the center of the flywheel ball) and an annularly arranged pair of arcuate cross channels, 34, the open ends of one of these cross channels being shown as connected to annular pipe 32 in FIGURE 3. At the middle point of each cross channel 34 there is located one of the two additional, diametrically-located air-bearing pads that are not visible in FIGURE 3.

Figure 3:
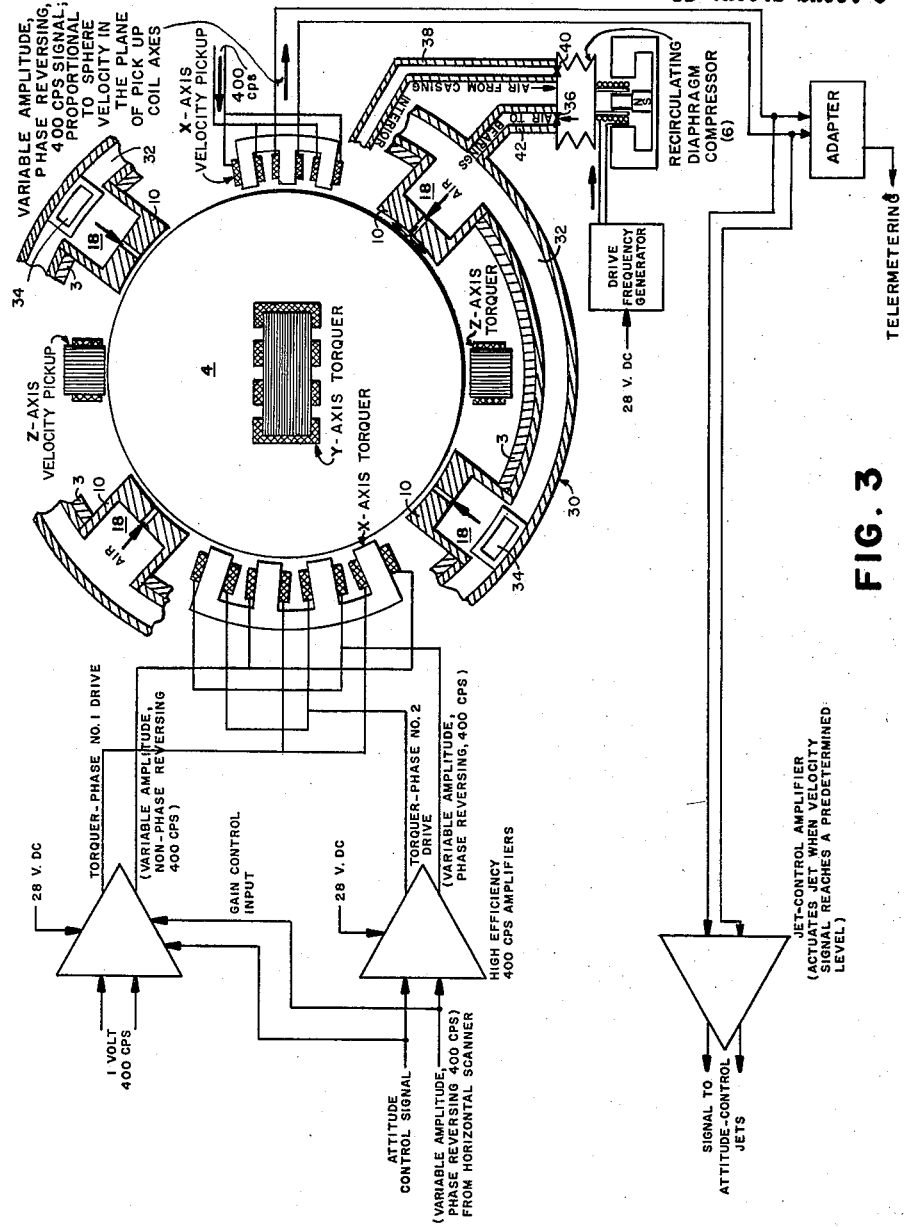
FIGURE 3 is a semi-schematic view, partly in section, of the electrical and air-bearing systems of the invention.
Figure 6:
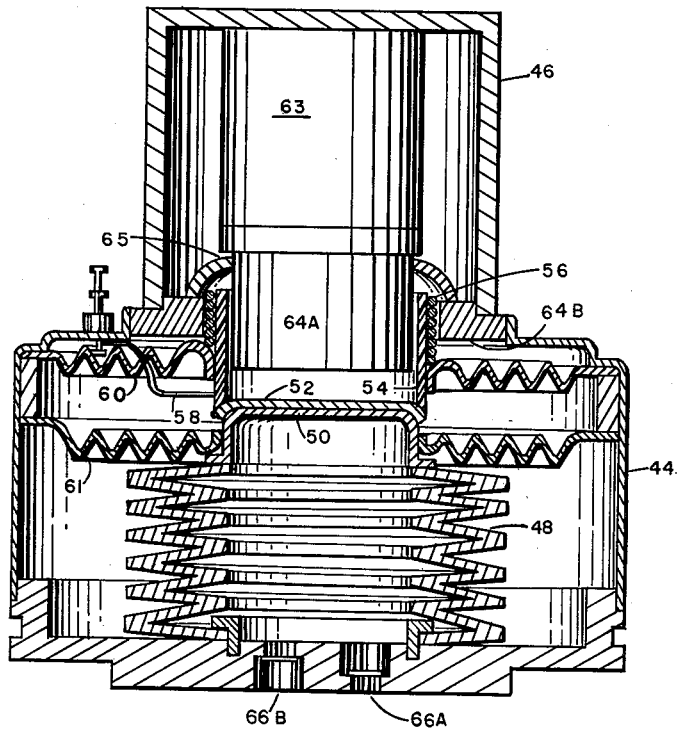
FIGURE 6 is a sectional, elevational view of the compressor unit.

Compressor 6 is shown in FIGURE 3 as supplying compressed air from outlet valve 36 thru manifold 30 to pad reservoirs 18, and as drawing air thru inlet pipe 38 and inlet valve 40. Pipe 38 is flow-connected to the interior of casing 3, preferably at a point on the other side of sphere 4 from outlet pipe 42. Since it is used in a space vehicle assembly the compressor should be as small as possible and fast in operation, to save weight, and as nearly frictionless as possible, to reduce the amount of heat that must be dissipated from the assembly to airless space. Although other types of light-weight compressors may be utilized, the pump disclosed herein is a diaphragm compressor. It is driven by a light-weight motor, comprising a permanent magnet, at a frequency that is substantially equal to the natural frequency of the oscillating mass of the electromagnetic coil and diaphragm. As shown in FIGURE 6, it comprises: casing 44 of non-magnetic material, for example aluminum; magnet housing 46, which is fixed to 44; bellows 48, preferably of beryllium-copper alloy; cap 50, hermetically fixed to one end of bellows 48; coil-supporting elements 52 and 54, of which sleeve 54 is non-conductive and preferably of plastic material; electro-magnetic coil 56, receiving current via conductors, of which one is shown at 58; flexible, annularly ridged disks 60 and 61, of non-magnetic material (for example aluminum alloy that is insulated from coil 56 and conductor 58), which are fixed to elements 50, 52 and 54 and support the diaphragm and coil in their oscillation relative to casings 44 and 46; and a permanent-magnet assembly, fixed to housing 46. The magnet assembly comprises light-weight permanent magnet 63, preferably of an alloy of aluminum, nickel and cobalt, and pole piece 64 and 64B of soft iron. Elements 63 and 64 are rigidly connected and are fixed to housing 46. Rigid element 65, of non-magnetic material helps support one end of the magnetic assembly against movement relative to casings 44 and 46. As indicated in FIGURE 1, pump casing 44 is fixed to main casing 3. When alternating current is supplied to and energizes coil 56 its current alternately opposes and is in phase with the flux between the soft-iron pole pieces 64 and 64B and since these poles are fixed to the housing, coil 56 and diaphragm cap 50 are oscillated relative to casing 44, thus withdrawing air from main casing 3 thru inlet valve 66A and forcing air to the bearings via outlet valve 66B.

Main casing 3 is rigidly fastened to support 2 by any suitable means, such as bolts 67. Since support 2 is a part of (or optionally is fixed to) the space vehicle framework, placing either a driving or a braking torque on sphere 4 about one of its three major axes will produce an opposite reaction of the vehicle about this axis. This reaction results in a corrective pivoting of the vehicle about the corresponding one of its three major axes. This attitude change may be the result of an electric signal indicating a need for a change of direction of a propelled space vehicle or of a signal of a need for a change of the attitude of an orbiting satellite.

Figure 7:
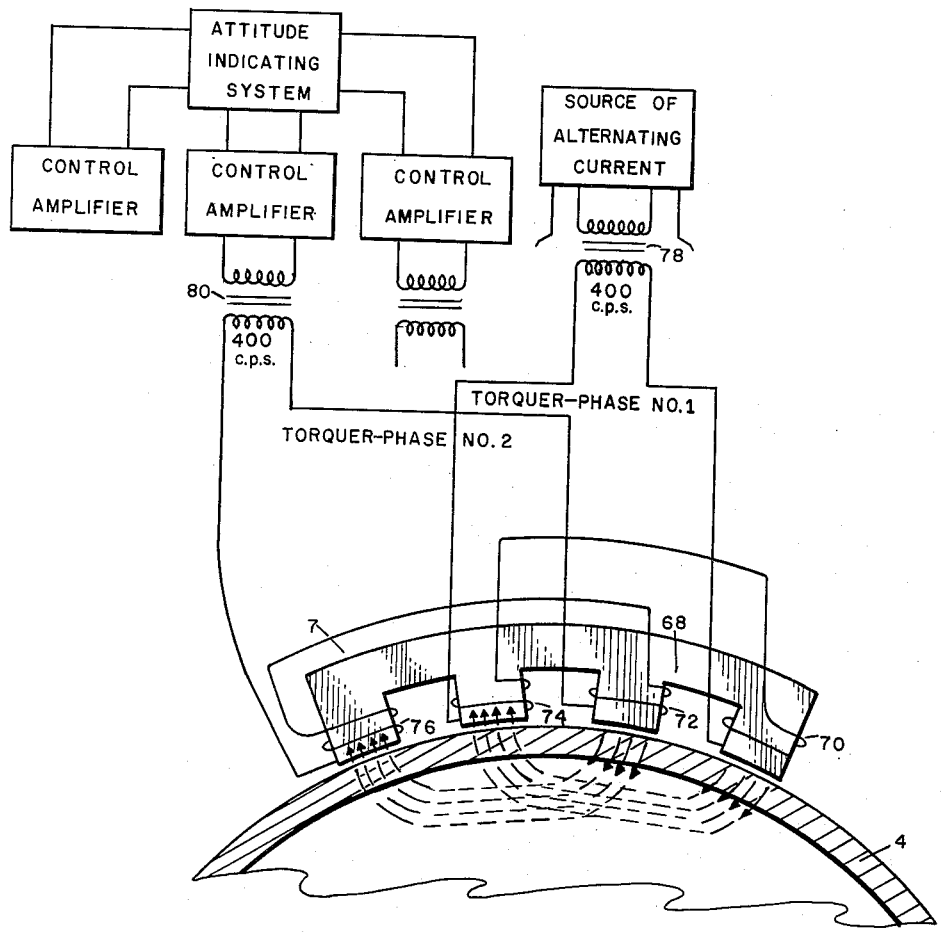
FIGURE 7 is a semi-schematic view of a portion of the spherical flywheel (shown in section) and one of the torque-providing assemblies.

In correction of the deviation in attitude of a satellite, for example, a signal of the deviation is supplied from an attitude-indicating system of a known type, schematically indicated in FIGURE 7. This signal is amplified and the resulting current is supplied to one of the torquers 7, which thus places a torque on flywheel ball 4, about one of its three main axes. If the sphere is already rotating about this axis, due to the stored momentum of a previous attitude correction, it is rotated faster; but if the new deviation is in the opposite direction from the old disturbance, the torque on the sphere is such as to brake its motion. If, on the other hand, the ball is not in motion about said axis, it is rotated by the torquer in one direction or the other about this axis, depending on the direction of the deviation of the vehicle in attitude. If the deviation is about some one of the multiplicity of sphere axes other than the said three major axes of the ball (which are either coincident with or parallel to the roll, pitch and yaw axes of the vehicle), a plurality of the torquers exert torques on the sphere, each of which is a component about its particular axis of the total, algebraic torque that is necessary.

Preferably, there are six of these torquers, each pair of diametrically opposed units serving to place a torque on the flywheel ball about one of its said major axes, and a reactionary torque on the vehicle about the corresponding one of its major axes. The detailed structure and functioning of one of the torquer assemblies are shown in FIGURES 7 to 10. With reference to FIGURE 7, laminated, magnetic core 68 has four projections, supporting electromagnetic coils 70, 72, 74 and 76. Coils 70 and 74 receive alternating current from transformer 78 of a constant voltage and amperage. Coils 72 and 76 receive alternating current from transformer 80 which is of the same strength as the current in coils 70 and 74 as long as no change in the attitude of the vehicle is needed. But if the vehicle begins to acquire an undesirable deviation about the axis of the sphere that is normal to the plane of the aligned axes of coils 70, 72, 74 and 76, a signal from the attitude-indicating system varies the current from transformer 80, so that the magnetic field around coils 72 and 76 is strengthened or weakened, depending on the direction of the disturbance.

A magnetic flux flows between the opposite poles that comprise coils 70 and 74; and there is also a flux between poles 72 and 76. Each of the poles thus induces eddy currents that circle beneath it.

Figure 8:
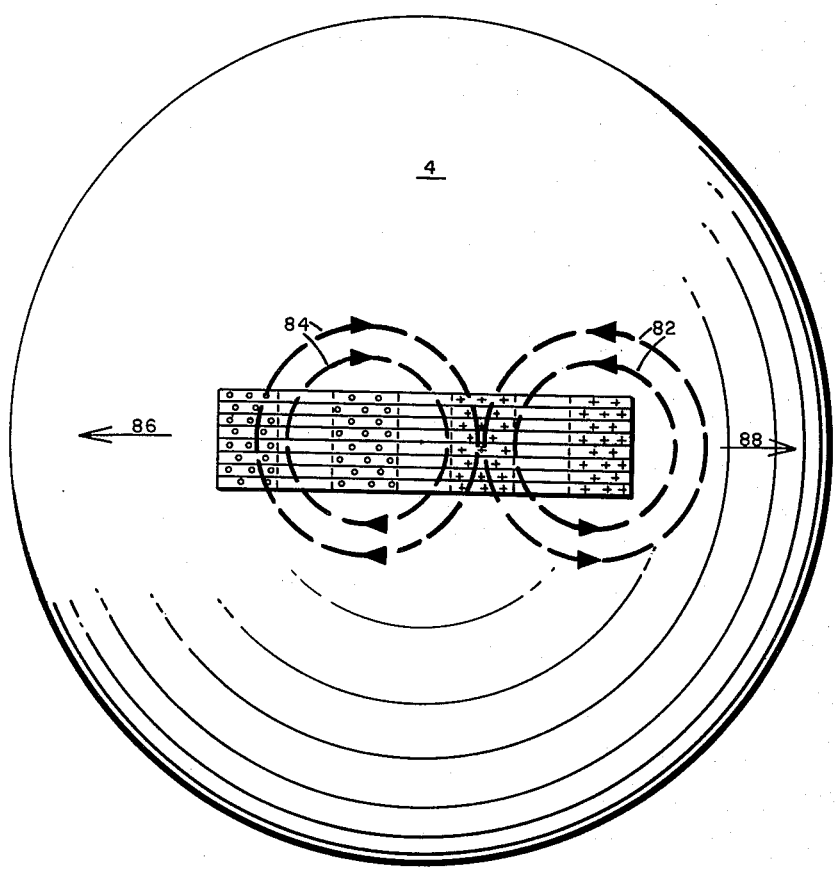
FIGURE 8 is a semi-schematic plan view, on a reduced scale, of the sphere and magnetic, torque-providing coils of FIGURE 3.
Figure 10:
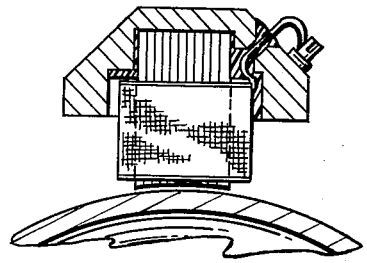
FIGURE 10 is a sectional view, from the plane 10—10, of the torquer of FIGURE 9.
Figure 9:
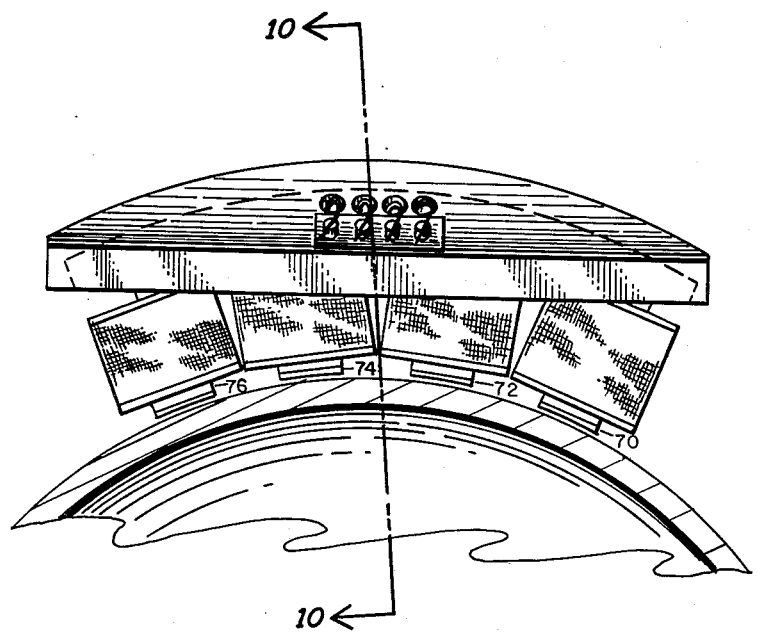
FIGURE 9 is a detail view of a set of the torquer coils.

In FIGURE 8, eddy currents 82 and 84 that are formed beneath poles 70 and 74 are shown. These currents flow in opposite directions and are of considerable strength because of the excellent conductivity of the aluminum alloy of sphere 4. Eddy currents 82 and 84 have a ninety-degree relationship to the flux in poles 70 and 74 which produces them. On the other hand, the flux in the other two poles, 72 and 76, is in phase with eddy currents 82 and 84. A changing, signal-influenced reaction between the eddy currents and the flux of poles 72 and 76 causes the flywheel ball to rotate in the direction of one of arrows 86 and 88. When the attitude signal to poles 72 and 76 is reversed, the direction of the flux of poles 72 and 76 is reversed, with a consequent reversal of the torque on the sphere, and of the reaction on the vehicle.

Since the electromagnets and the changing portions of the sphere that are below the poles are parts of an unusual type of eddy-current motor (operating due to the reaction between the flow of eddy current and the magnetic flux) a metal should be selected for the sphere that is highly conductive. This selective problem, however, is complicated by the need for a flywheel ball that is as light in weight as is possible for a given reaction-producing moment of inertia. This requirement is of especial importance because the sphere is supported by air bearings.

The most conductive metals are gold, copper, silver, aluminum, brass and iron. All these materials are heavy except aluminum, which has a specific gravity of only 2.708. But pure aluminum presents a difficulty in the construction of a flywheel sphere, which should hold its balanced shape during rotation. If the ball were of solid aluminum it would retain its spherical form, but the resulting eddy-current motor would be less effective than that for a hollow sphere. This is due to the fact that the eddy currents would penetrate more deeply in the aluminum of a solid sphere; whereas in a hollow ball the air in the hollow space has such high resistivity that the eddy currents are concentrated in the outer shell, near the poles. On the other hand, this air of the ball's hollow space, as indicated in FIGURE 7, is of little resistance to the flow of the magnetic flux. The flux from one pole follows a short path thru the metal of the sphere's shell, and then nearly a straight course to a point beneath its associated pole of opposite polarity.

The present inventors have found that the most efficient attitude-controlling flywheel-and-motor assembly comprises: three orthogonally-arranged sets of torquer assemblies, each torquer of which comprises four or more electromagnetic poles having their axes aligned in a plane that is normal to one of the three main axes of casing 3 (preferably utilizing electric current from solar cells in space); and an air-bearing-supported, hollow flywheel sphere of a strong, highly conductive aluminum alloy. Examples of such an alloy are aluminum bronzes (particularly the white, light-weight aluminum bronzes) and aluminum-magnesium alloy. The three sets of torquer assemblies may consist of only three torquers, each of which receives controlled current in varying amounts from one of the three control amplifiers shown in FIGURE 7, and also receives current of constant amperage from the source of alternating current indicated in FIGURE 7. But preferably, an assembly of six four-pole torquers and a hollow sphere of white aluminum bronze are utilized.

In some instances the flywheel assembly of this invention will efficiently function for a long time within the limits of safe angular speed of the sphere, without correction for maximum speed. In this case, one attitude correction about a given axis, requiring an increase of speed of the ball, is later balanced by an attitude correction in the opposite direction, requiring a braking of the sphere's speed about that axis. But in most long-term uses of the apparatus the flywheel occasionally will reach its maximum angular velocity (or component of velocity) about a given axis; and then no further attitude change in one direction about that axis is possible unless the speed of the sphere be arbitrarily reduced. This invention therefore comprehends a means for providing a signal that indicates the angular velocity of the sphere and means for resetting the sphere at zero speed when the signal indicates a predetermined maximum speed.

Figure 11:
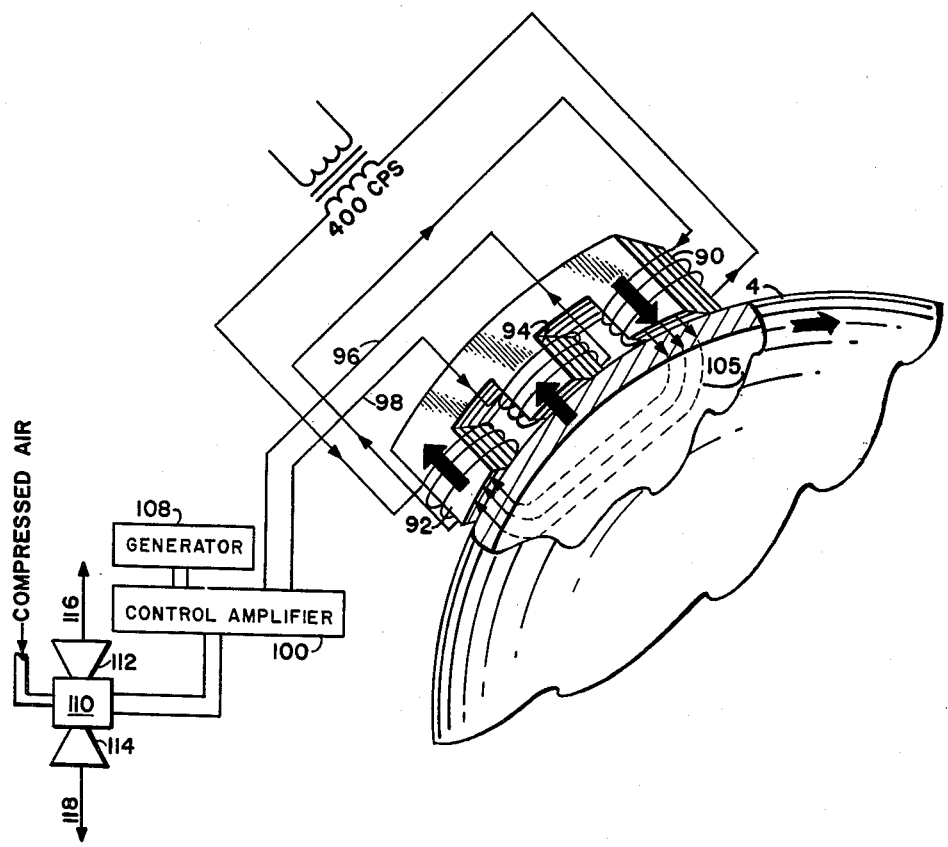
FIGURE 11 is a semi-schematic view of a portion of the spherical flywheel, shown in section, and of one of the inductive tachometers that indicate the angular speed of the sphere.
Figure 12:
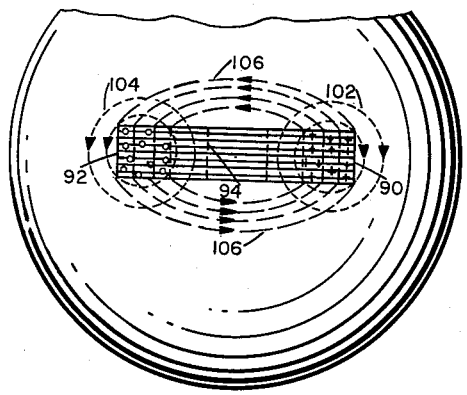
FIGURE 12 is a semi-schematic plan view, on a reduced scale, of the flywheel ball and the set of electromagnetic, flux-providing coils shown in FIGURE 11.
Figure 13:
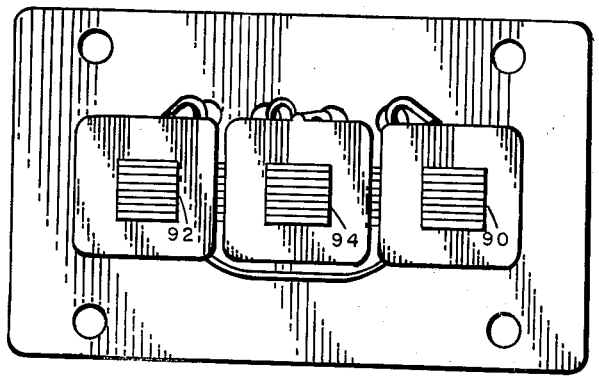
FIGURE 13 is a detail, plan view of the structure of one of the sets of tachometer coils.

The aluminum alloy of the flywheel is particularly adapted to function as part of an induction type of speed pickup or tachometer. Such a pickup is shown in FIGURES 11 to 13 as comprising: three electromagnets, 90, 92 and 94, functioning with varying portions of the aluminum alloy of sphere 4; means for supplying alternating current (for example at 400 cycles per second) to magnets 90 and 92; and conductors 96 and 98 for conducting alternating current from magnet 94 to control amplifier 100. In FIGURES 11 and 12 magnetic flux lines 105 are indicated as flowing from magnet 90 to magnet 92. The flow downward of the flux of pole 90 is indicated in FIGURE 12 by the crosses of arrow feathers and the flow upward in pole 92 by dots representing the forward points of arrows.

Magnets 90 and 92 induce three types of eddy currents, indicated in FIGURE 12 at 102, 104 and 106, in the aluminum alloy of the ball. Because the sphere is hollow these eddy currents are concentrated near the lower poles of the magnets. Currents 102 and 104, induced beneath magnets 90 and 92, circle in opposite directions and therefore together produce a flow past the sphere-ward pole of middle magnet 94 in the same direction on both sides of the pole. Hence no flux is produced in this pole from eddy currents 102 and 104. Currents 106, however, eddy around the pole in only one angular direction; and these currents induce a flux in the core of magnet 94. The strength and polarity of this induced flux and the resulting signal depend on the angular speed and direction of rotation of the sphere about the axis that goes thru the ball's center and is perpendicular to the plane of the axes of the coils.

If the direction of the sphere's rotation is reversed the direction of eddy currents 106 is reversed, thus also reversing the instantaneous phase relationship between these currents and the flux flows which produce them. This change reverses the relationship in control amplifier 100 between the voltage from the speed pickup and the voltage from generator 108. This causes a reversal in polarity of the control voltage to the electric motor or solenoid in valve-control mechanism 110.

This mechanism is of a known type, providing for the closing of a valve in the throat of one of the oppositely-directed pair of attitude-controlling jets 112 and 114, while the other jet is opened by the simultaneous operation of a valve in its throat. If the signal from the pickup is of a predetermined strength that indicates the maximum safe speed of sphere 4 about the axis involved, control amplifier 100 actuates this valve-control mechanism for ejecting gas in the proper one of directions 116 and 118 to change the vehicle's attitude relative to said axis until the sphere's speed about this axis is braked to zero.

Figure 14:
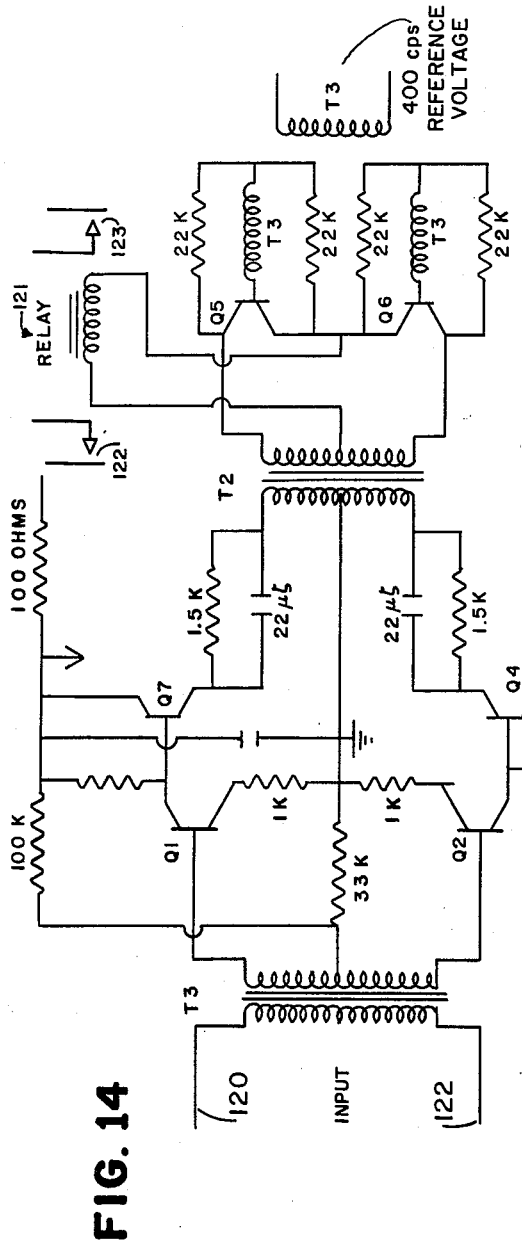
FIGURE 14 is a diagram of the electrical circuits of one of the control amplifiers, for controlling one of the auxiliary, attitude-controlling, reaction-jet units.

The circuits of amplifier 100 which control this reduction of the sphere's speed about each of its three major axes are indicated in FIGURE 14. The A.C. signal voltage coming from the flywheel velocity pickup via conductors 120 and 122 is amplified by transistors $Q_1$, $Q_2$, $Q_3$ and $Q_4$. The resulting amplified A.C. signal is then demodulated into a polarity-reversing D.C. signal voltage by transistors $Q_5$ and $Q_6$. The demodulator's output voltage is then used to energize reaction-jet control relay 121.

This relay functions as follows:

(1) Relay 12 "picks up" (i.e., closes one of its contacts 122 and 123) at a specified relatively high voltage. For a positive polarity it closes contacts 122; for a negative polarity, contacts 123.

(2) The relay later "drops out" (that is, it opens its contacts after the operating voltage drops to a relatively low value, which is considerably smaller percentage of the voltage than the "pick up" voltage referred to above). This, for example, may be five percent of the pick-up voltage.

(3) Relay 121 is a slow-to-release type of relay. This ensures that after the operating voltage has decreased to a low enough level to allow the relay to drop out there is still a time delay before it actually does so, and therefore a delay before it shuts off the control current that goes via 122 or 123 to the control valves of reaction-jet units 9.

In operation, the jet applies a reaction torque on the vehicle in such a direction as to cause the control system to reduce the flywheel velocity about said axis to a specified point, which is almost zero. At this low velocity (approximately five percent of the flywheel's saturation velocity), the voltage input to the amplifier is such as to cause relay 121 to drop out, with the needed time delay.

The overall control circuit thus operates as follows: when the output signal from one of the velocity pickups reaches a level relative to one of the three axes which indicates that the flywheel is saturated in its absorption of undesired momentum about this axis, the amplifier's output voltage is of the relatively high level that is necessary to cause the jet-control relay to pick up, and thus send a signal to open the proper jet valve. The slow-to-release relay then keeps the circuit closed until the flywheel's speed is greatly reduced.

Figure 15:
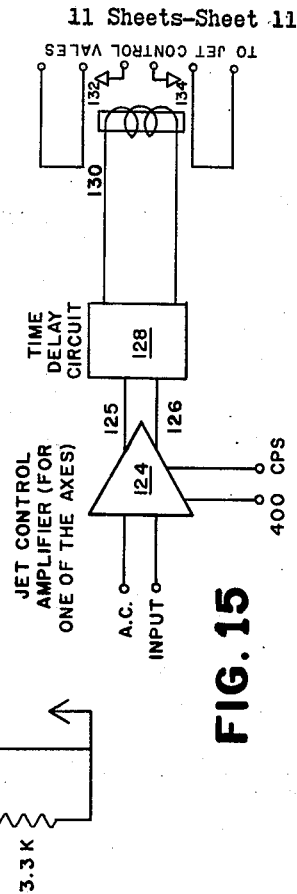
FIGURE 15 is a diagram of an alternative type of means for controlling the reaction-jet units.

In FIGURE 15 there is illustrated an alternate, optional combination of the jet-control amplifier and time-delay means. In this arrangement the flywheel saturation velocity is reduced all the way back to zero. This re-setting of the flywheel at zero speed is accomplished by means of a time-delay circuit. The amplifier and demodulator (124) supply D.C. voltage thru conductors 125 and 126 to time-delay circuit 128. This circuit, which is of a known design, allows the relatively high voltage due to the flywheel's saturation velocity to close the appropriate set of contacts (132 or 134) of relay 130, and thus to energize the jet valves. Thereafter, circuit 128 holds said set of contacts in operation until the flywheel's velocity about the axis involved has reached zero.

The following invention is claimed:

1. A device of the character described, adapted to be used in airless space, comprising: an hermetically-sealed, gas-containing casing; a hollow, spherical ball in said casing having an exterior, spherical surface of highly conductive, non-magnetic metal having a considerably greater degree of electrical conductivity than of electrical resistivity and having a specific gravity of less than three; gaseous-bearing means sealingly mounted on said casing and having surfaces within said casing for freely supporting said ball on gaseous-bearing films; pumping means on said casing for withdrawing gas from said casing, and compressing and supplying said gas to said gaseous-bearing means; an assembly of at least three torquers, fixed to said casing, for providing torque on said ball and opposite, reactionary torque on said casing, each of said torquers having at least four electromagnetic coils whose axes are directed toward the center of said ball, when it is in its normal position of being equidistantly spaced from said coils, said coil axes of each torquer being in a single one of three orthogonal planes passing thru the center of the ball in its said normal position, said coils and ball being closely juxtaposed whereby a current thru the coils produces eddy currents in said highly conductive metal; means for supplying reference current of a predetermined strength to at least two coils of each of said torquers; control means for supplying to at least two other coils of each torquer an electric current of variable strength, whereby when the strength of said variable current departs from that of said reference current the eddy currents in said metal are quickly changed, thus placing a torque on said ball and a reaction on said casing.

2. A device as set forth in claim 1, in which said metal is aluminum alloy.

3. A device as set forth in claim 1, in which said gaseous-bearing means comprises gaseous-bearing pads fixed to said casing; each of said pads having an outwardly opening reservoir adjacent to the outer surface of said casing, inwardly-concave, spherical, gaseous-film-providing surfaces whose curvature is centered at the center of said ball in its said normal position, gas-conducting passages opening thru said surfaces into the interior of said casing, and gas-conducting passages leading to said reservoir; said casing comprising a cover portion over each of said reservoirs, hermetically fixed to the remainder of the casing.

4. A device as set forth in claim 1, in which said pumping means comprises a housing, a diaphragm, electromagnetic means mounted on said diaphragm for oscillating it relative to said housing, a permanent magnet mounted in said housing adjacent to said electromagnetic means, and means for supplying to said electromagnetic means an alternating current approximating the natural frequency of the oscillating mass of said diaphragm and electromagnetic means.

5. A device as set forth in claim 2, in which said assembly comprises pairs of said torquers, each pair being diametrically opposed relative to said ball in its said normal position, and each pair having its coil axes in a single plane thru the center of said ball in its said normal position.

6. A device as set forth in claim 5, in which said assembly has three pairs of torquers.

7. A device as set forth in claim 2, which further comprises an assembly of at least three aligned inductive pickups, each having at least three electromagnetic coils with their axes pointed toward the center of said ball in its said normal position, at least one of said pickups measuring and electrically signalling the angular velocity of the ball in each of said three orthogonal planes; said device further comprising means for supplying a reference current to the two outer coils of each pickup and means for conducting current induced in the middle coil of each pickup to a point outside of said casing.

8. A space vehicle, having roll, pitch and yaw axes, comprising: an outer shell; a support fixed to said shell; an hermetically-sealed, gas-containing casing fixed to said support; gaseous-bearing pads fixed to said casing, having surfaces for supporting gaseous-bearing films, and having gas-conducting passages opening thru said surfaces into the interior of said casing; a hollow sphere of aluminum alloy, freely supported within and slightly spaced from said surfaces; a compressor, supported by said casing, having an intake that is in communication with said interior; means for conducting compressed gas from said compressor to said passages; at least three torquers fixed to said casing, for providing torque on said sphere and reactionary torque on said vehicle about each of said vehicle axes, each of said torquers having at least four electromagnetic coils whose axes are directed toward the center of said sphere when it is in its normal position of being equidistantly spaced from said bearing pad surfaces, said coil axes of each torquer being in a single plane that is perpendicular to two other planes that contain the other torquer-coil axes, said three planes being orthogonal and intersecting at substantially the center of said sphere, said coils and sphere being closely juxtaposed, whereby a current thru said coils produces eddy currents in said aluminum alloy; means for supplying reference electric current of a predetermined strength to at least two coils of each of said torquers; control means for supplying to at least two other coils of each torquer an electric current of variable strength, whereby when the strength of said variable current departs from that of said reference current the eddy currents in said alloy are quickly changed, thus placing a torque on said sphere and a reaction on said vehicle about one of its said three axes; attitude-indicating means for supplying a signal of a need for a change of the attitude of the vehicle about one of its said three axes; and conductive means for electrically connecting said attitude-indicating means and said control means.

9. A device as set forth in claim 8, in which said bearing pad surfaces are spherical and have a common center of curvature that coincides with the center of curvature of said sphere in its said normal position.

10. A device as set forth in claim 8, which further comprises: a plurality of assemblies of oppositely-directed, attitude-controlling jets, mounted on said shell, each of said assemblies having at least one pair of oppositely directed jets for controlling the attitude of said vehicle about one of said roll, pitch and yaw axes, thereby changing the position of one of said planes relative to said sphere; speed-indicating means for supplying a signal of the angular velocity of said sphere in each of said planes; jet-controlling means connected to each of said jet assemblies, receiving said signal and actuated by said signal when it is at a predetermined maximum value, to supply motive fluid to the one of each pair of oppositely directed jets that is so positioned relative to said vehicle axes as to influence said attitude-indicating means to send an attitude-controlling signal thru said conductive means commanding one of said torquers to place a speed-braking torque on said sphere.

11. A device as set forth in claim 10, in which said jet-controlling means comprises an amplifier and holding means, influenced by said maximum-value signal, to continue supplying fluid to said one of each pair of oppositely positioned jets until the signal from said speed-indicating means indicates zero angular speed of said sphere.

12. A device as set forth in claim 10, in which said speed-indicating means comprises three inductive pickups, each of said pickups having three aligned electromagnetic coils whose axes are directed toward the center of said sphere, when it is in said normal position, and are located in a single coil-axis plane, the three coil-axis planes of the three pickups being orthogonal, each of said pickups further comprising means for supplying a reference current to two of said pickup coils and means for conducting current induced in the other one of the pickup coils to said jet-controlling means.

13. In an attitude-control system for a vehicle: a support; an air-containing casing having a generally spherical interior surface; a hollow sphere of aluminum alloy within said casing; air-bearing pads, fixed to said casing, having spherical, air-film-supplying surfaces that are positioned closely adjacent to and floatingly support said sphere, and having passages leading to said surfaces; an air compressor supported by said casing, having an intake that is in communication with the interior of the casing; means for conducting air from said compressor to said passages; three sets of electromagnetic coils whose axes are substantially radial relative to said sphere, the axes of each of said sets being in a single plane that is normal to each of the planes that contain coil axes of the other two of said sets, each of said sets consisting of two groups of four coils in each group; means to supply a reference, alternating current of a predetermined strength to a first coil of each of said four groups of four aligned coils and thence to a third one of said coils; whereby when said variable current changes in strength the eddy currents beneath said second and fourth coils correspondingly vary, thus placing a torque on said sphere and an opposite reaction on said casing.

14. A device as set forth in claim 13, which further includes; three other, speed-indicating sets of electromagnetic coils whose axes are substantially radial relative to said sphere and are located in three orthogonal planes thru said sphere, each of said speed-indicating sets comprising three aligned pickup coils; means for conducting a reference, alternating current to the outer two of said pickup coils; and means for conducting an induced current from the middle one of said three pickup coils.

15. A space vehicle, having roll, pitch and yaw axes, comprising: an outer shell; a hermetically-sealed, gas-containing casing fixed to said shell; gaseous-bearing pads fixed to said casing, having surfaces for supporting gaseous-bearing films, and having gas-conducting passages opening thru said surfaces into the interior of said casing; a hollow sphere of aluminum alloy, freely supported within said surfaces, said sphere having a maximum safe velocity; a compressor, supported by said casing, having an intake that is in communication with said interior and an outlet that is in communication with said passages; a torquer fixed to said casing, for providing torque on said sphere and reactionary torque on said casing and vehicle about one of said vehicle axes, said torquer comprising a set of electromagnetic coils whose axes are substantially radial to said sphere; means to supply electric current of a predetermined strength to at least one of the coils of said set; signal-controlled means for supplying electric current to at least one other of said coils; attitude-indicating means, electrically connected to said signal-controlled means, for supplying a signal of a need for a change of the vehicle's attitude; an attitude-controlling reaction jet, fixed to said shell, for controlling the attitude of said vehicle about said one of the axes; speed-indicating means for supplying an electric signal of the angular velocity of said sphere, relative to said one axis; and electrically-actuated means for controlling said jet, connected to said jet and to said speed-indicating means, actuated by said signal when it is at a predetermined maximum value to operate said jet; said electrically-actuated means comprising a time-delay means, for holding said jet in operation until said angular velocity of the sphere relative to said axis is reduced to a relatively small percentage of said maximum velocity.

16. A device as set forth in claim 15, in which said time-delay means is a time-delay circuit, for holding said jet in operation until said angular velocity of the sphere is reduced substantially to zero.

17. A space vehicle, having roll, pitch and yaw axes, comprising: an outer shell; a support fixed to said shell; a hermetically-sealed, gas-containing casing fixed to said support; gaseous-bearing pads fixed to said casing, having surfaces for supporting gaseous-bearing films, and having gas-conducting passages opening thru said surfaces into the interior of said casing; a hollow sphere having an exterior, spherical surface of highly conductive, non-magnetic metal having a considerably greater degree of electrical conductivity than of electrical resistivity and having a specific gravity of less than three, freely supported within and slightly spaced from said surfaces; a compressor, supported by said casing, having an intake that is in communication with said interior; means for conducting compressed gas from said compressor to said passages; at least three torquers fixed to said casing, for providing torque on said sphere and reactionary torque on said vehicle about each of said vehicle axes, each of said torquers having at least four electromagnetic coils whose axes are directed toward the center of said sphere when it is in its normal position of being equidistantly spaced from said bearing pad surfaces, said coil axes of each torquer being in a single plane that is perpendicular to two other planes that contain the other torquer-coil axes, said three planes being orthogonal and intersecting at substantially the center of said sphere, said coils and sphere being closely juxtaposed, whereby a current thru said coils produces eddy currents in said metal; means for supplying reference electric current of a predetermined strength to at least two coils of each of said torquers; control means for supplying to at least two other coils of each torquer an electric current of variable strength, whereby when the strength of said variable current departs from that of said reference current the eddy currents in said metal are quickly changed, thus placing a torque on said sphere and a reaction on said vehicle about one of its said three axes; attitude-indicating means for supplying a signal of a need for a change of the attitude of the vehicle about one of its said three axes; and conductive means for electrically connecting said attitude-indicating means and said control means.

References Cited in the file of this patent

UNITED STATES PATENTS

| | | |
|---|---|---|
| 471,155 | Thomson | Mar. 22, 1892 |
| 2,270,876 | Esval | Jan. 27, 1942 |
| 2,293,092 | Wittkuhns | Aug. 18, 1942 |
| 2,849,159 | Kaufmann | Aug. 26, 1958 |
| 2,857,122 | Maguire | Oct. 21, 1958 |
| 3,017,777 | Haeussermann | Jan. 23, 1962 |
| 3,044,309 | Buchhold | July 17, 1962 |